United States Patent
Licht et al.

(10) Patent No.: US 11,738,999 B2
(45) Date of Patent: Aug. 29, 2023

(54) SYSTEMS AND METHODS FOR MAKING CARBON NANOSTRUCTURES

(71) Applicant: C2CNT LLC, Venice, FL (US)

(72) Inventors: Stuart Licht, Venice, FL (US); Gad Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 17/760,690

(22) PCT Filed: Oct. 29, 2020

(86) PCT No.: PCT/US2020/058046
§ 371 (c)(1),
(2) Date: Mar. 15, 2022

(87) PCT Pub. No.: WO2021/087165
PCT Pub. Date: May 6, 2021

(65) Prior Publication Data
US 2022/0388847 A1    Dec. 8, 2022

Related U.S. Application Data

(60) Provisional application No. 62/927,389, filed on Oct. 29, 2019.

(51) Int. Cl.
*C01B 32/16* (2017.01)
*C25B 1/135* (2021.01)
*B82Y 40/00* (2011.01)

(52) U.S. Cl.
CPC .............. *C01B 32/16* (2017.08); *B82Y 40/00* (2013.01); *C25B 1/135* (2021.01); *C01P 2004/03* (2013.01)

(58) Field of Classification Search
CPC ..... C01B 32/16; C01B 32/158; C01B 32/159; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02;
(Continued)

(56) References Cited

U.S. PATENT DOCUMENTS

2019/0039040 A1    2/2019    Licht
2019/0271088 A1    9/2019    Licht

FOREIGN PATENT DOCUMENTS

WO    2018156642 A1    8/2018

OTHER PUBLICATIONS

Ren, et al., One-Pot Synthesis of Carbon Nanofibers from CO2, Nano Lett. 2015; 15: 6412-6148 with Supporting Information (Year: 2015).*

(Continued)

*Primary Examiner* — Daniel C. McCracken
(74) *Attorney, Agent, or Firm* — Chamberlain, Hrdlicka, White, Williams & Aughtry

(57) ABSTRACT

Embodiments of the present disclosure relate to methods and systems for providing an electrolysis reaction in a molten carbonate electrolyte to synthesize helical carbon nanostructures (HCNSs). The electrolyte, electrode composition, current density, temperature and additives all may have important roles in the formation of HCNS. With control of these parameters, a variety of specific, uniform high yield HCNS can be synthesized by molten carbonate electrolysis, according to embodiments of the present disclosure.

15 Claims, 14 Drawing Sheets

(58) Field of Classification Search
CPC ............ C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 40/00; C25B 1/135; C01P 2004/03; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

OTHER PUBLICATIONS

Ren, et al., Transformation of the greenhouse gas CO2 by molten electrolysis into a wide controlled selection of carbon nanotubes, Journal of CO2 Utilization 2017; 18: 335-344 (Year: 2017).*

Li, et al., A novel route to synthesize carbon spheres and carbon nanotubes from carbon dioxide in a molten carbonate electrolyzer, Inorg. Chem. Front. 2018; 5: 208-216 (Year: 2018).*

Novoselova, et al., Electrochemical synthesis, morphological and structural characteristics of carbon nanomaterials produced in molten salts, Electrochimica Acta 2016; 211: 343-355 (Year: 2016).*

Wu et al, "One-pot synthesis of nanostructured carbon materials from carbon dioxide via electrolysis in molten carbonate salts." Carbon 106 (2016): 208-217, [online] <https://www.sciencedirect.com/science/article/pii/S0008622316303852>; <DOI:https://doi.org/10.1016/j.carbon.2016.05.031>.

International Search Report dated Jan. 22, 2021, issued in corresponding PCT Application No. PCT/US2020/058046.

Written Opinion on the International Searching Authority dated Jan. 22, 2021, issued in corresponding PCT Application No. PCT/US2020/058046.

* cited by examiner

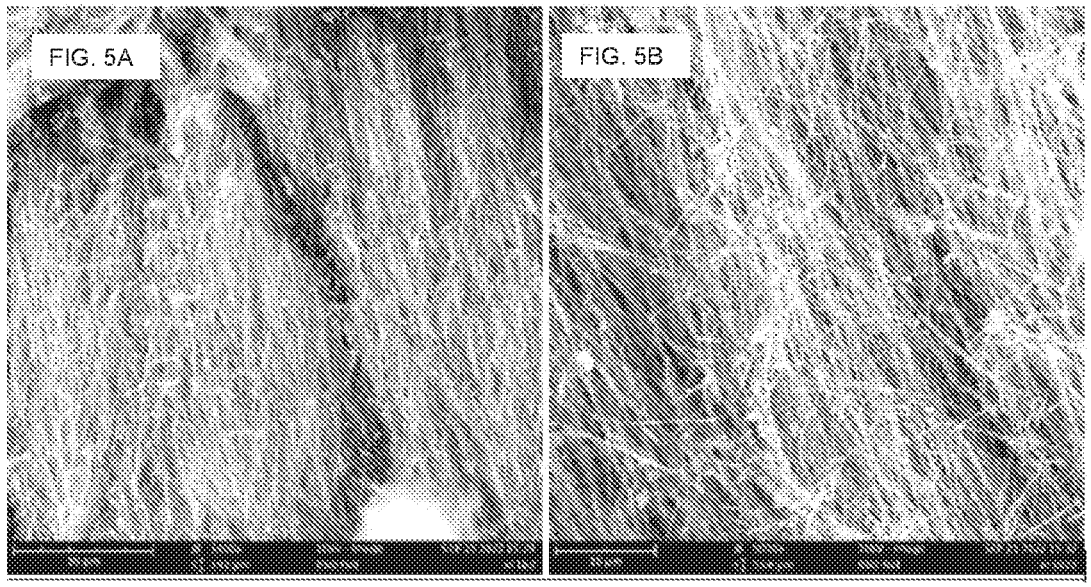

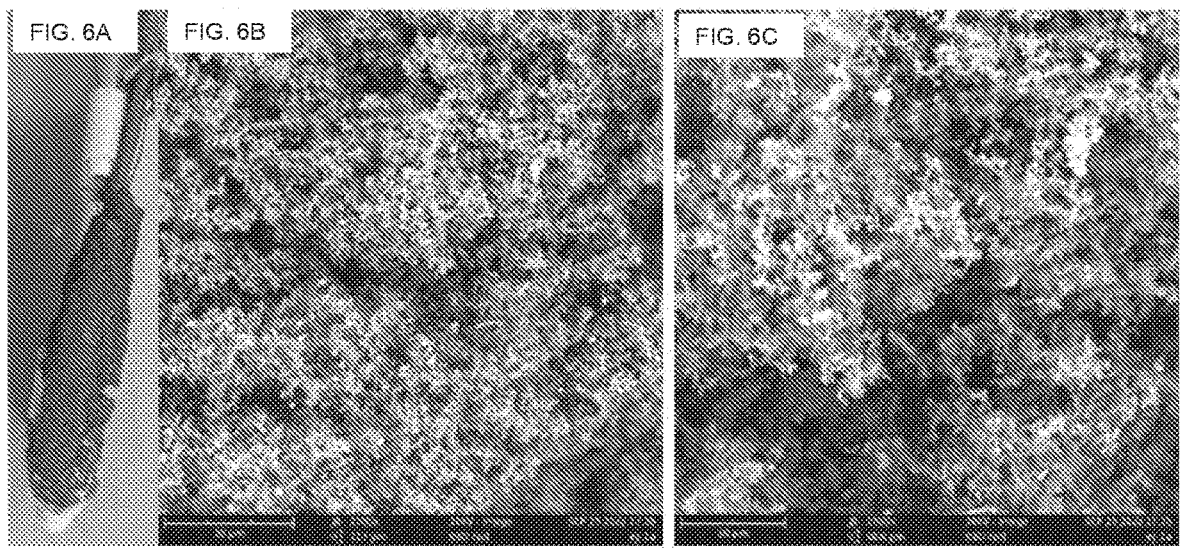

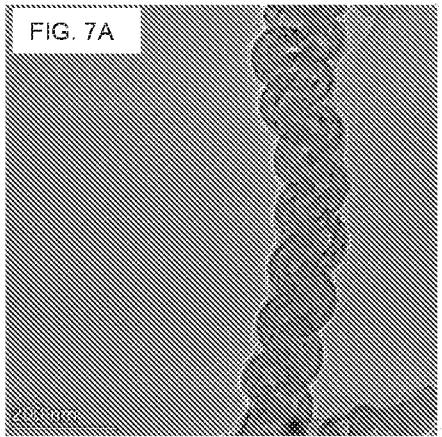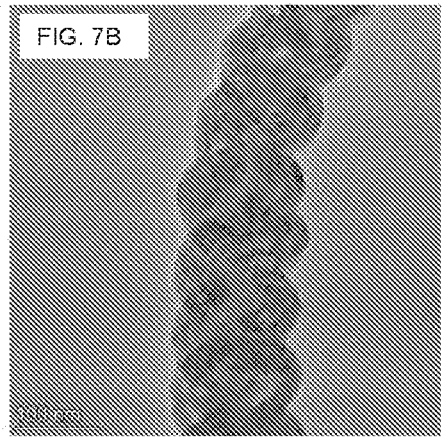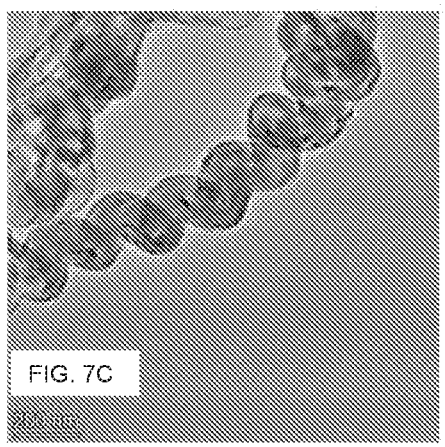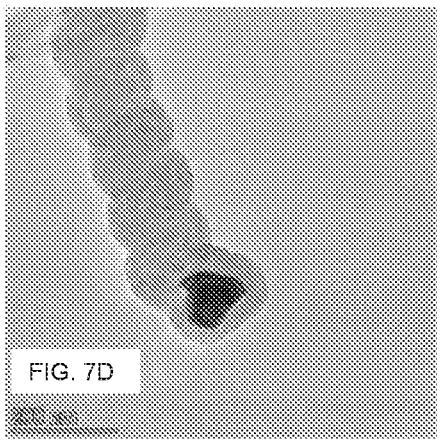

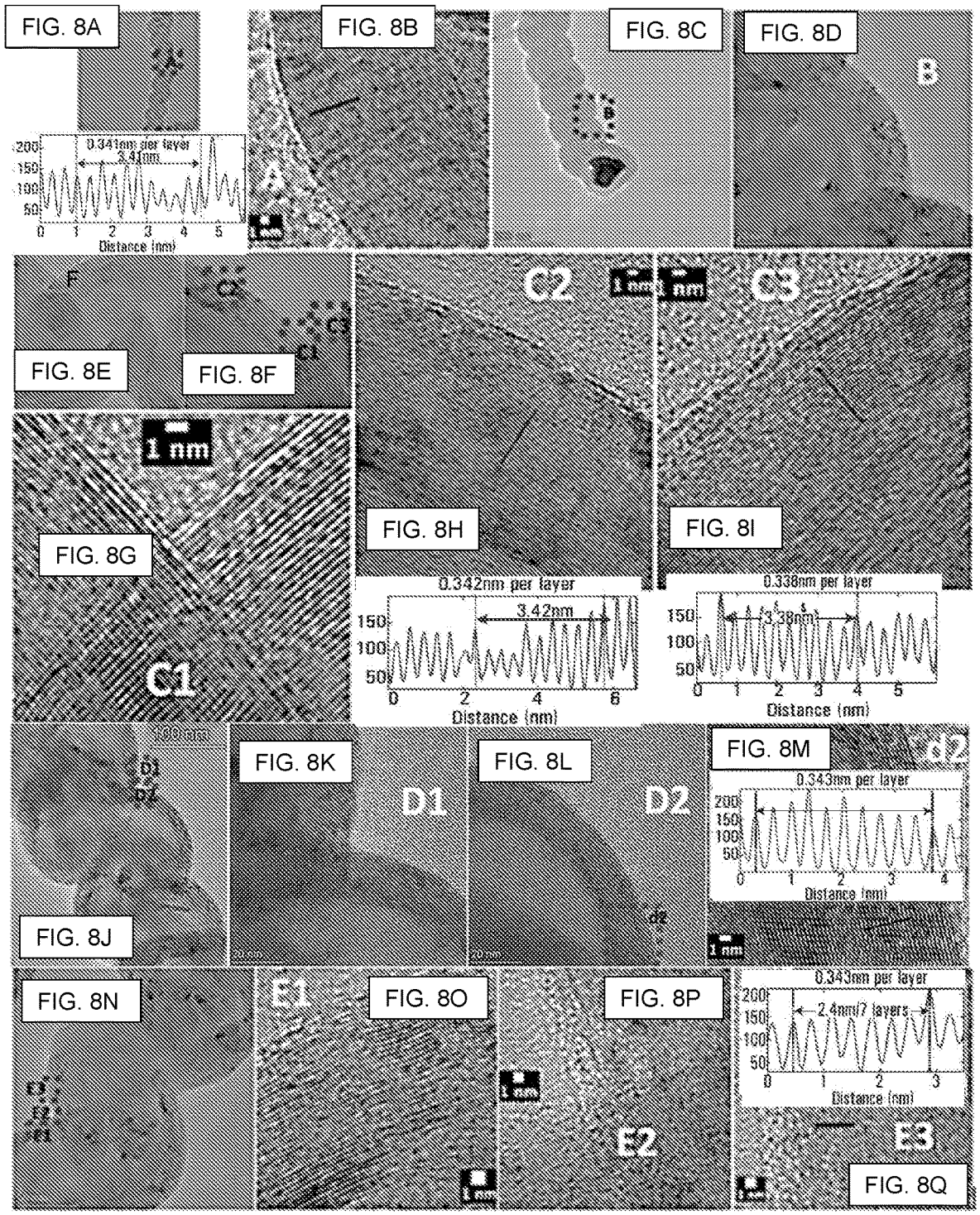

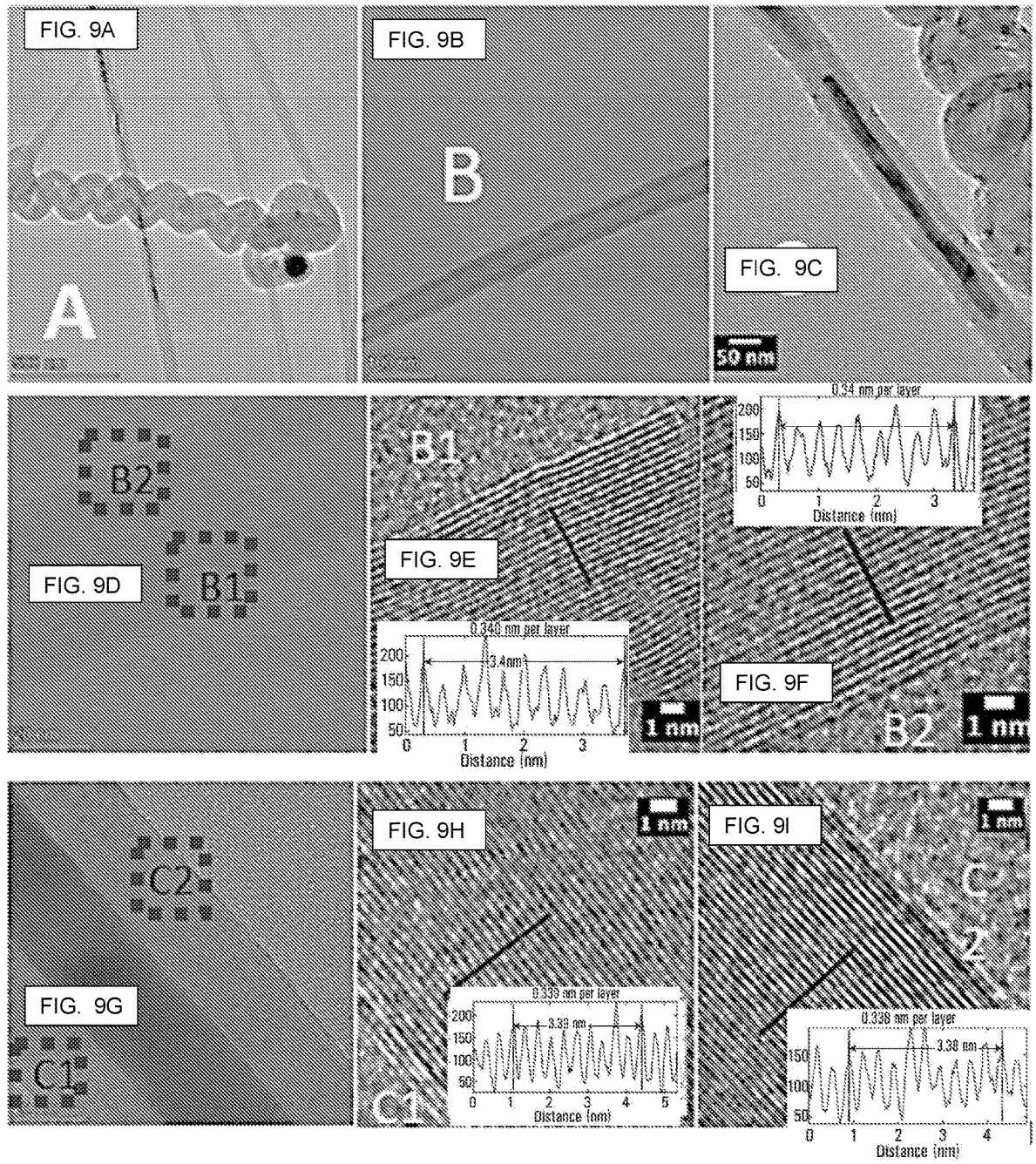

FIG. 10A

D1) EDS of wall

| Element Number | Element Symbol | Element Name | Atomic Conc. | Weight Conc. |
|---|---|---|---|---|
| 6 | C | Carbon | 100.0 | 100.0 |

0 1 2 3 4 5 6 7 8 9 10 11 12 13 14 15 16 17 18 19
278,047 counts in 30 seconds

FIG. 10B

D2) EDS of interior

| Element Number | Element Symbol | Element Name | Atomic Conc. | Weight Conc. |
|---|---|---|---|---|
| 6 | C | Carbon | 90.6 | 68.6 |
| 24 | Cr | Chromium | 6.2 | 20.4 |
| 26 | Fe | Iron | 3.1 | 11.0 |

0 1 2 3 4 5 6 7 8 9 10 11 12 13 14 15 16 17 18 19
154,705 counts in 30 seconds

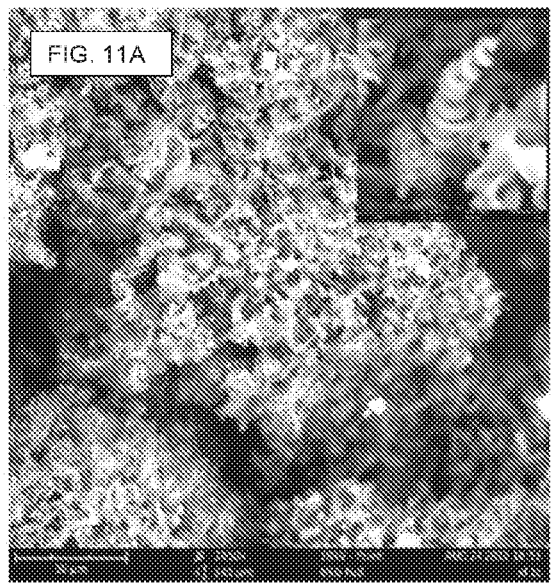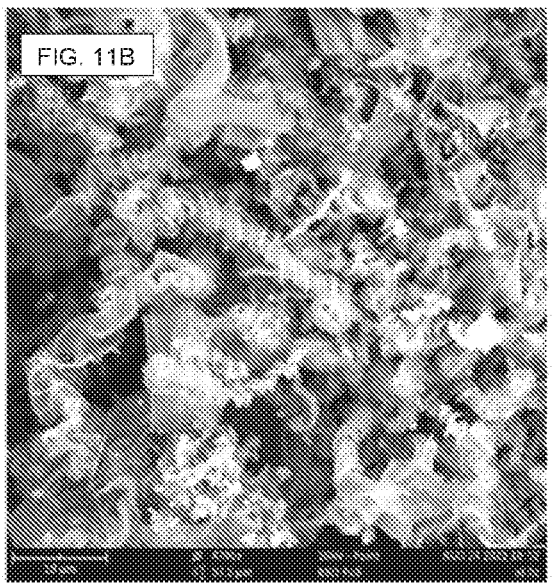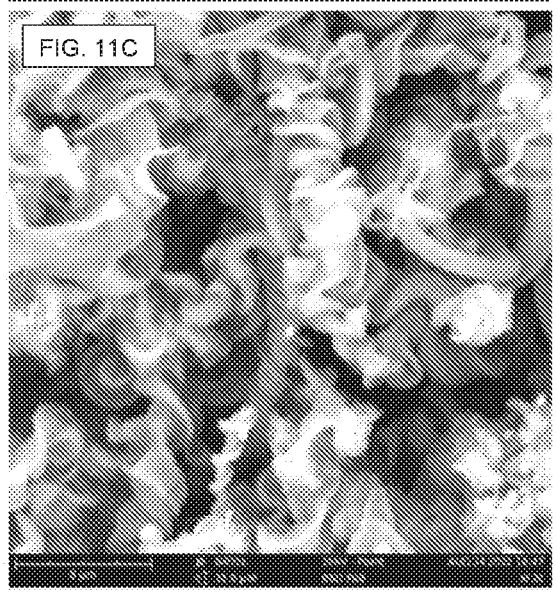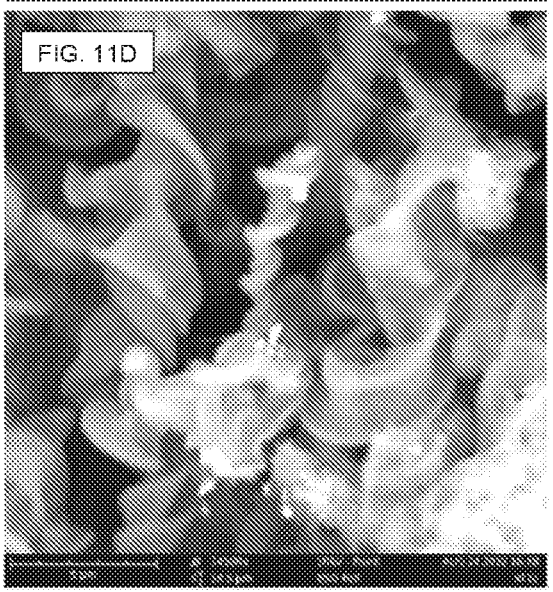

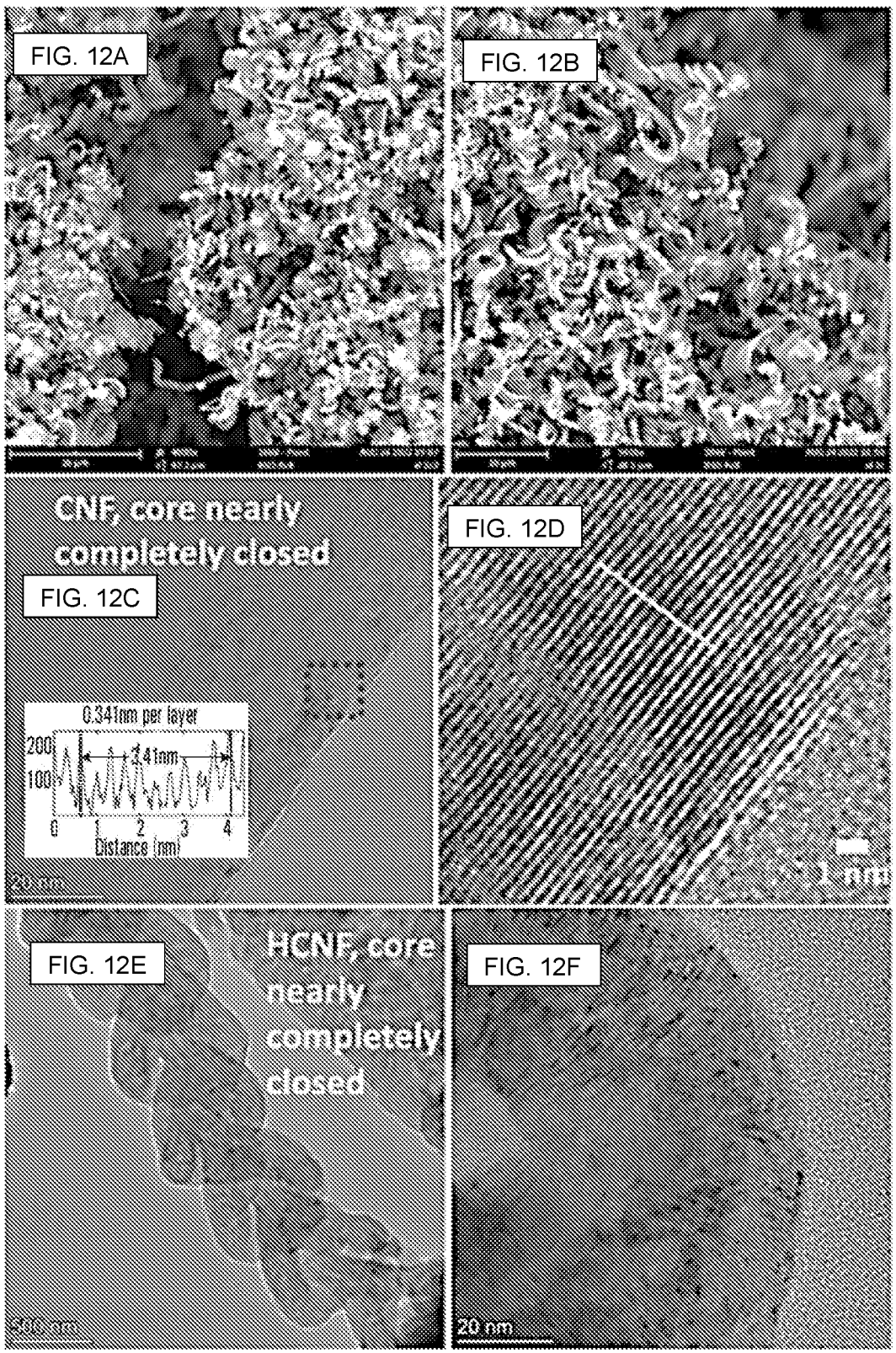

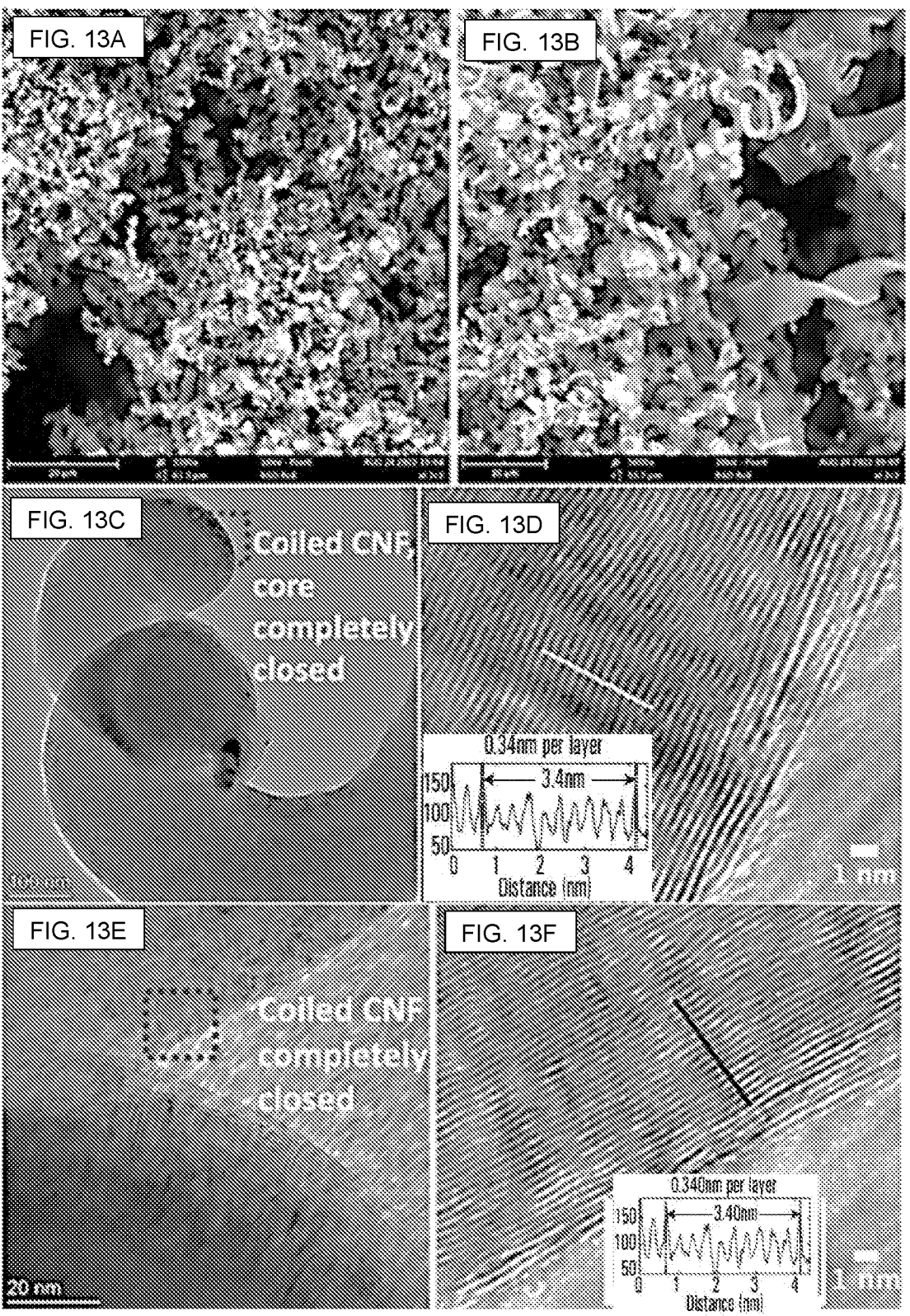

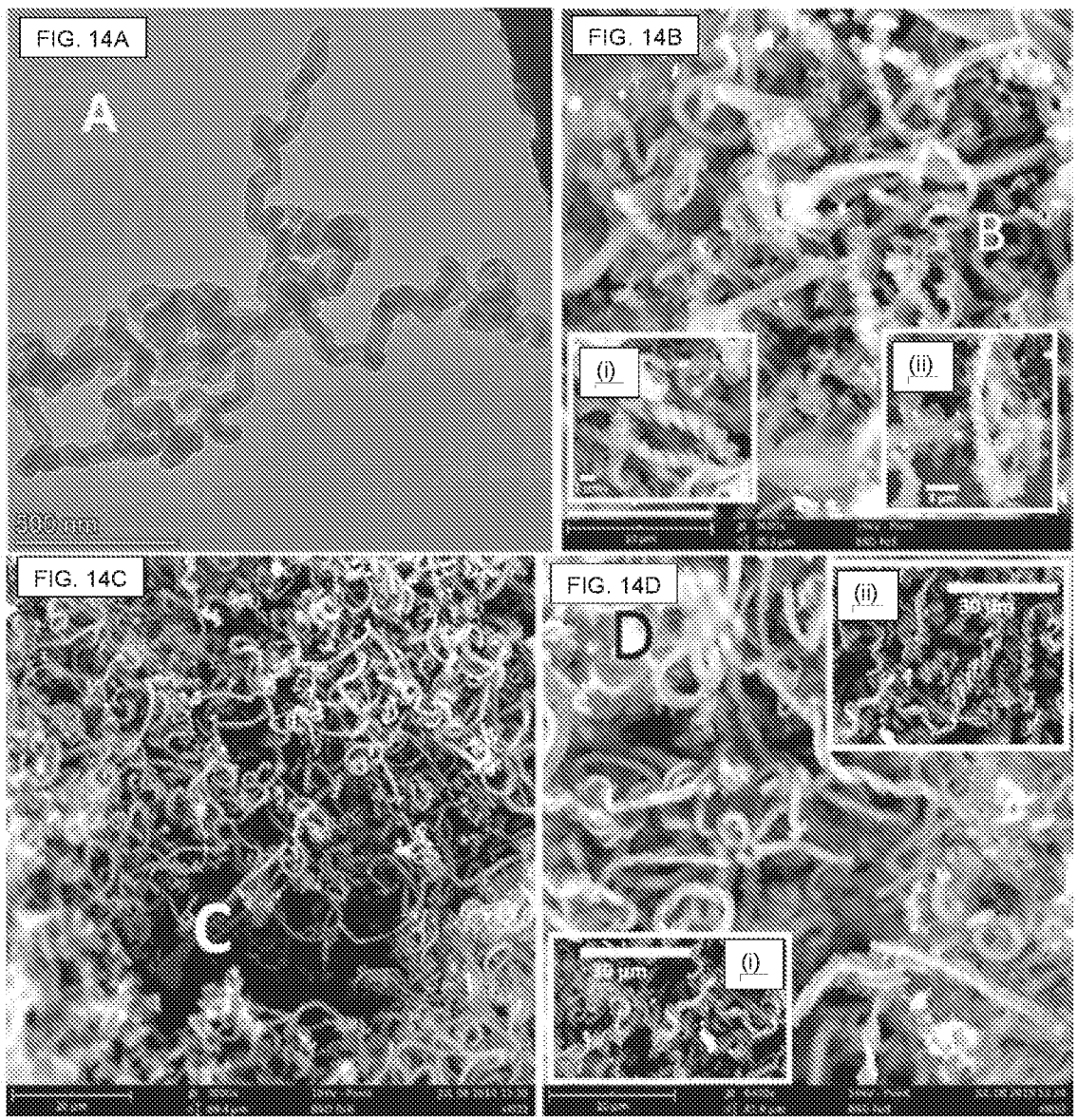

SYSTEMS AND METHODS FOR MAKING CARBON NANOSTRUCTURES

CROSS REFERENCE TO RELATED APPLICATIONS

This application claims the benefit of U.S. Provisional Patent Application Ser. No. 62/927,389, filed Oct. 29, 2019, the entire contents thereof are incorporated herein by reference.

TECHNICAL FIELD

The present disclosure relates to making carbon nanostructures. In particular, the present disclosure relates to systems and methods for making helical carbon nanostructures using a molten carbonate process.

BACKGROUND

Carbon nanotubes (CNTs) are comprised of cylindrical walls of rolled graphene sheets. An occasionally reported, and unusual, variation of this morphology is termed coiled or helical carbon nanotubes (HCNTs). Examples of this unusual HCNT allotrope are shown in FIG. 1 (as provided in Zhang, M. and Li, J. Carbon nanotube in different shapes. Materials Today, 2009. 12(6), 12-18).

HCNTs were first predicted to exist in 1993, and then were first discovered in 1994. To date, the few reported examples of HCNT synthesis have been accomplished by chemical vapor deposition (CVD) using metal catalyzed organic or organometallic precursors. CVD is an energy intensive and expensive process that is associated with a large carbon footprint of up to 600 tons of carbon dioxide ($CO_2$) emitted per ton of carbon nanomaterial produced. $CO_2$ emissions are a growing global problem that all of us confront because anthropogenic $CO_2$ emissions are responsible for the increasing the concentration of atmospheric $CO_2$ and the resultant climate change.

SUMMARY

Embodiments of the present disclosure relate to systems and methods that provide for an electrochemical synthesis of helical carbon nanostructures (HCNS), in which the reactant used to produce HCNS is carbon dioxide ($CO_2$). In some embodiments of the present disclosure, the systems and methods have a carbon-negative footprint.

Some embodiments of the present disclosure relate to a method for synthesizing helical carbon nanostructures (HCNS). The method comprising the steps of aligning an anode spaced from a cathode for defining an inter-electrode space; introducing a molten carbonate electrolyte into the inter-electrode space; introducing a carbon input into the inter-electrode space; applying a current across the electrodes; and collecting a product that comprises the HCNS from the electrode.

In some embodiments of the present disclosure, the method further includes a step of applying at least two of the following parameters: applying the current with a high electrolysis current density; heating the inter-electrode space to at least 725° C.; adding into the inter-electrode space an electrolyte additive agent; and adding iron oxide to the inter-electrode space.

Some embodiments of the present disclosure relate to a system for making helical carbon nanostructures. The system comprises an anode and a cathode that together define an inter-electrode space. The system further includes a source of current for applying a current density is at least 0.2 A/cm2 across the electrodes, a source of heat for regulating the inter-electrode space at a temperature of at least about 725° C., and a source of carbon for introducing a carbon input into the inter-electrode space.

Some embodiments of the present disclosure relate to HCNS such as, but not limited to: a helical carbon nanotube (HCNT), a helical carbon nanofiber (HCNF), a double stranded HCNT, a braided HCNT, a helical nano-platelet (HCNP), a sp3 defective CNT, a deformed CNT, a bent CNT, a curved CNT or combinations thereof.

As compared to straight carbon nanotube (CNT) growth, the growth of HCNTs has been proposed to occur via two independent, but not exclusive, mechanisms. One model that combines localized stresses and anisotropic rates of carbon deposition on catalyst particles is widely accepted. The first mechanistic pathway for HCNT growth is that an uneven growth causes pentagonal and heptagonal defects that lead to curving. This may be due to either the catalyst or the substrate having different faces or use of a catalyst that is composed of different metals and, therefore, that promotes different growth rates. An example of such a heterogeneous metal catalyst is a tin and iron (Sn/Fe) catalyst or indium and iron (In/Fe) catalyst that promotes HCNT growth by chemical vapor deposition (CVD). For example, tin accelerates CNT growth, but iron seems to grow at a slower pace resulting in defective CNTs during CVD growth. Our molten carbonate growth process has a complex mixture of metals from electrodes that may cause this feature to appear.

The second proposed mechanistic pathway for HCNT growth is that strain or fast growth-rates cause coiling. For example, if a CNT is growing faster at a catalyst then it can organize in a straight fashion, it will coil like yarn coming out a hole too rapidly to be laid down straight on a mat during chemical vapor deposition (CVD) growth.

BRIEF DESCRIPTION OF THE DRAWINGS

These and other features of the present disclosure will become more apparent in the following detailed description in which reference is made to the appended drawings.

FIG. 4 shows images of HCNS synthesized according to embodiments of the present disclosure, wherein.

FIG. 5 shows SEM images of CNTs synthesized by a molten carbonate electrolysis process, with or without iron oxide present within the molten carbonate, wherein FIG. 5A shows CNTs synthesized without iron oxide and has a scale bar of 50 microns; FIG. 5B shows CNTs synthesized without iron oxide and has a scale bar of 10 microns; FIG. 5C shows CNTs synthesized with 0.1% iron oxide and has a scale bar of 100 microns; and, FIG. 5D shows CNTs synthesized with 0.1% iron oxide and has a scale bar of 10 microns.

FIG. 6 shows SEM images of a mixture of HCNS and CNTs synthesized by a molten carbonate electrolysis process, with iron oxide present within the molten carbonate, wherein FIG. 6A shows a photograph of the cooled and extracted product prior to removal from the cathode; FIG. 6B shows a mixture of HCNS and CNTs with a scale bar of 30 microns; and, FIG. 6C shows the same mixture of FIG. 6B with a scale bar of 10 microns.

FIG. 7 shows low magnification TEM images of HCNS synthesized according to embodiments of the present disclosure, wherein FIG. 7A has a scale bar of 200 nm; FIG. 7B has a scale bar of 100 nm; FIG. 7C has a scale bar of 200 nm; and, FIG. 7D has a scale bar of 200 nm.

FIG. 8 shows high magnification TEM images of HCNS synthesized according to embodiments of the present disclosure, wherein FIG. 8A shows the same image as FIG. 7A with an area of interest identified by A and the distance between layers of the HCNS; FIG. 8B shows the area of interest A with a scale bar of 1 nm; FIG. 8C shows the same image as FIG. 7D with an area of interest identified by B; FIG. 8D shows the area of interest B in FIG. 8C with a scale bar of 20 nm; FIG. 8E shows another portion of a HCNS, synthesized according to embodiments of the present disclosure, with a scale bar of 50 nm and an area of interest identified by F; FIG. 8F shows the area of interest F in FIG. 8E with a scale bar of 20 nm and further areas of interest C1, C2 and C3; FIG. 8G shows the area of interest C1 in FIG. 8E with a scale bar of 1 nm; FIG. 8H shows the area of interest C2 in FIG. 8E with a scale bar of 1 nm and the distances between layers of the HCNS therein measured at the black transecting line; FIG. 8I shows the area of interest C3 in FIG. 8E with a scale bar of 1 nm and the distances between layers of the HCNS therein measured at the black transecting line; FIG. 8J shows another portion of a HCNS, synthesized according to embodiments of the present disclosure, with two areas of interest identified with D1 and 02; FIG. 8K shows the area of interest D1 in FIG. 8J with a scale bar of 20 nm; FIG. 8L shows the area of interest D2 in FIG. 8J with a scale bar of 20 nm and a further area of interest identified as d2; FIG. 8M shows the area of interest d2 in FIG. 8L and the distances between layers of the HCNS therein measured at the black transecting line; FIG. 8N shows another portion of a HCNS, synthesized according to embodiments of the present disclosure, with three areas of interest identified with E1, E2 and E3 and a scale bar of 50 nm; FIG. 8O shows the area of interest E1 in FIG. 8N with a scale bar of 1 nm; FIG. 8P shows the area of interest E2 in FIG. 8N with a scale bar of 1 nm; FIG. 8Q shows the area of interest E3 in FIG. 8N with a scale bar of 1 nm and the distances between layers of the HCNS therein measured at the black transecting line.

FIG. 9 shows TEM images of a minor proportion of the mixture shown in FIG. 6, wherein FIG. 9A shows a portion of both HCNS and CNTs with a scale bar of 500 nm; FIG. 9B shows a portion of a single CNT with a scale bar of 100 nm; FIG. 9C shows a portion of a HCNS and a CNT with a scale bar of 50 nm; FIG. 9D shows another portion of a CNT with a scale bar of 20 nm and two areas of interest identified with B1 and B2; FIG. 9E shows the area of interest B1 in FIG. 9D with a scale bar of 1 nm and the distances between layers of the CNTs therein measured at the black transecting line; FIG. 9F shows the area of interest B2 in FIG. 9D with a scale bar of 1 nm and the distances between layers of the CNTs therein measured at the black transecting line; FIG. 9G shows another portion of a CNT with a scale bar of 20 nm and two areas of interest identified with C1 and C2; FIG. 9H shows the area of interest C1 in FIG. 9G with a scale bar of 1 nm and the distances between layers of the CNTs therein measured at the black transecting line; and FIG. 9I shows the area of interest C2 in FIG. 9G with a scale bar of 1 nm and the distances between layers of the CNTs therein measured at the black transecting line.

FIG. 10 shows electron dispersive spectroscopy (EDS) results of the minor proportion of the mixture shown in FIG. 6, wherein FIG. 10A shows the EDS results within the CNT wall; and, FIG. 10B shows the EDS results within the interior of the CNT.

FIG. 11 shows SEM images of HCNS synthesized according to embodiments of the present disclosure, wherein FIG. 11A shows HCNS with a scale bar of 30 microns and a magnified inset panel with a scale bar of 3 microns; FIG. 11B shows HCNS with a scale bar of 10 microns; FIG. 11C shows HCNS with a scale bar of 8 microns; and, FIG. 11D shows HCNS with a scale bar of 5 microns.

FIG. 12 shows SEM images of HCNS synthesized according to embodiments of the present disclosure, wherein FIG. 12A shows HCNS with a scale bar of 20 microns; FIG. 12B shows HCNS with a scale bar of 10 microns; FIG. 12C shows HCNS with a scale bar of 20 nm and an area of interest identified by the dotted rectangle and the distances between layers of the HCNS therein measured at the white transecting line in FIG. 12D; FIG. 12D shows the area of interest in FIG. 12C; FIG. 12E shows another portion of HCNS with a scale bar of 500 nm; and, FIG. 12F shows a portion of the HCNS in FIG. 12E with a scale bar of 20 nm.

FIG. 13 shows SEM images of HCNS synthesized according to embodiments of the present disclosure, wherein FIG. 13A shows HCNS with a scale bar of 20 microns; FIG. 13B shows HCNS with a scale bar of 10 microns; FIG. 13C shows a portion of HCNS with a scale bar of 100 nm and an area of interest identified by a dotted rectangle; FIG. 13D shows the area of interest in FIG. 13E with a scale bar of 1 nm and the distances between layers of the CNTs therein measured at the white transecting line; and FIG. 13F shows a portion of HCNS with a scale bar of 20 nm and an area of interest identified by a dotted rectangle.

FIG. 14 shows panel A shows TEM and panels B-D SEM images of curved carbon nano-morphologies synthesized according to embodiments of the present disclosure, wherein FIG. 14A shows curved carbon nanotubes with a scale bar of 500 microns; FIG. 14B shows curved carbon nanomaterials including helical morphologies with a scale bar of 10 microns with an insert panel (i) that shows them with a scale bar of 1 micron and an insert panel (ii) that shows them with a scale bar of 3 microns; FIG. 14C shows curved carbon nanomaterials with a scale bar of 20 microns; and, FIG. 14D shows curved carbon nanomaterials including helical morphologies with a scale bar of 10 microns and an insert panel (i) that shows them with a scale bar of 30 microns and an insert panel (ii) that shows them with a scale bar of also of 30 microns.

DETAILED DESCRIPTION

It is known that molten carbonates have an affinity to absorb both atmospheric and flue gas levels of $CO_2$. For example, 13C isotope has been used in $CO_2$ to track and demonstrate that $CO_2$ originating from the gas phase serves as the renewable carbon building blocks in the observed CNT product in an electrochemical process that uses molten lithium carbonate. The net reaction for this electrochemical process follows:

$$\text{Dissolution: } CO_2(gas) + Li_2O(soluble) \rightarrow Li_2CO_3(molten) \quad (1)$$

$$\text{Electrolysis: } Li_2CO_3(molten) \rightarrow C(CNT) + Li_2O(soluble) + O_2(gas) \quad (2)$$

$$\text{Net: } CO_2(gas) \rightarrow C(CNT) + O_2(gas) \quad (3)$$

Figure 1:
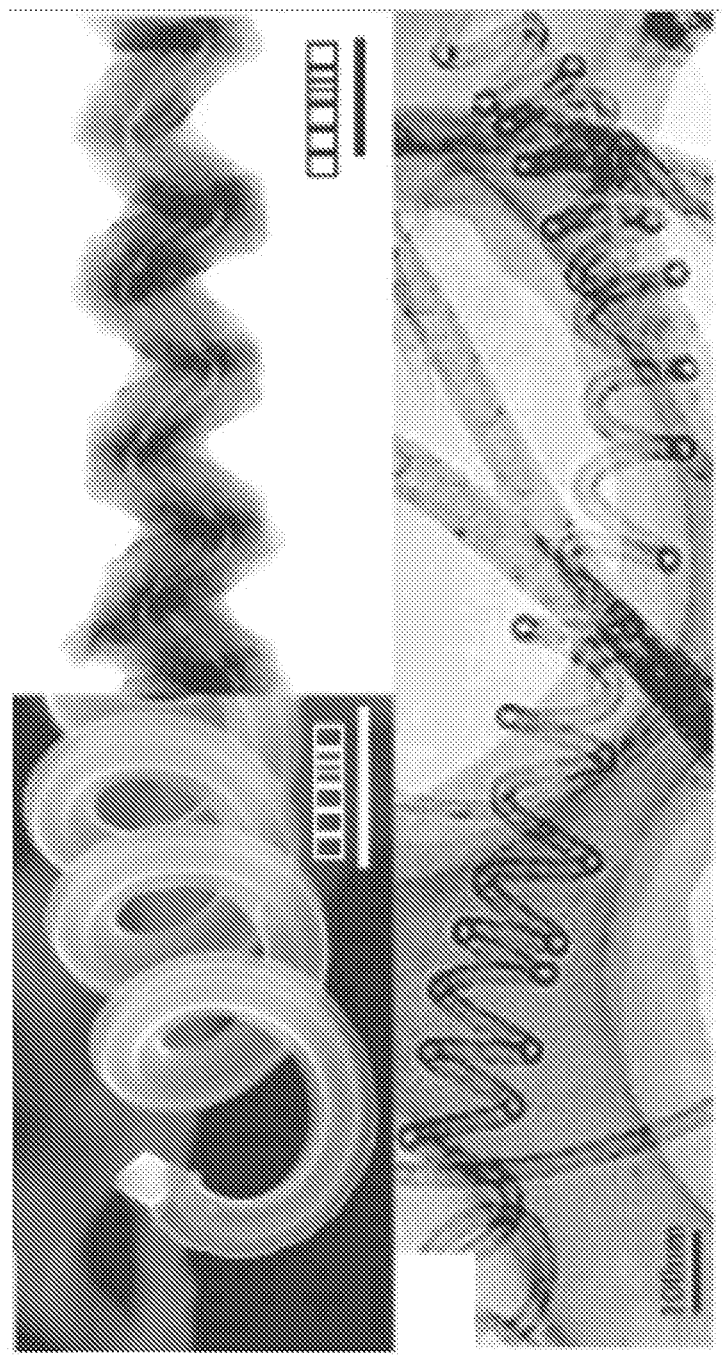
FIG. 1 provides images of helical carbon nanotubes (HCNTs).
Figure 2:
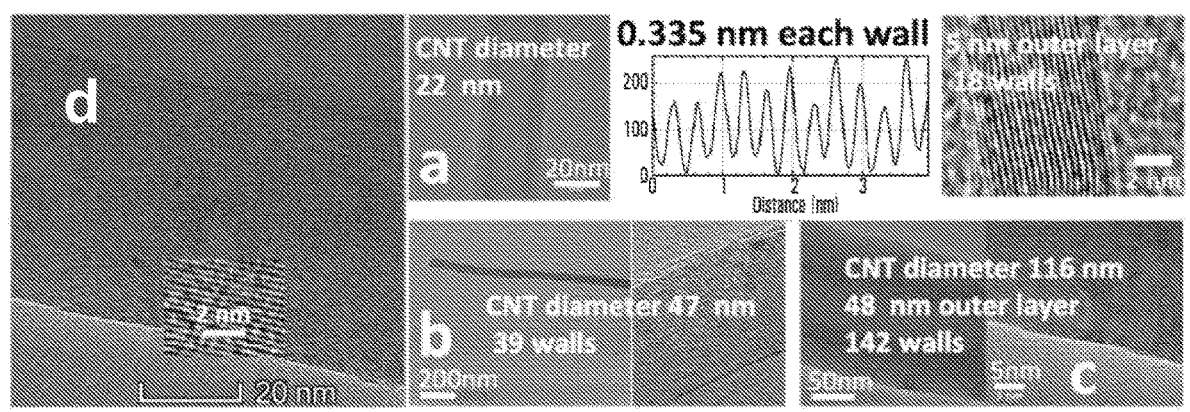
FIG. 2 provides transmission electron microscopy (TEM) images of carbon nanotubes (CNTs) synthesized in molten carbonate, wherein panel (a) shows CNTs synthesized after 15 minutes; panel (b) shows CNTs synthesized after 30 minutes; panel (c) shows CNTS synthesized after 90 minutes; and, panel (d) shows a closer image of the CNTs shown in panel (c).

An important component of this electrochemical process includes transition metal nucleated growth, such as the addition of nickel powder which leads to clearly observable non-helical carbon nanotube (CNT) walls as shown in FIG. 2. FIG. 2 includes images from a transmission electron microscope (TEM) of CNT walls that were synthesized in molten carbonated synthesized CNTs. The synthesis of the CNT shown in FIG. 2 was achieved by performing electrolysis in 770° C. lithium carbonate (molten Li2CO3) at a 5 cm2 coiled copper wire with nickel powder. Panel d of FIG. 2 shows an expanded view of the CNT product after 90 minutes of the electrochemical synthesis reaction. The synthesis produced a pure CNT product whose diameter increases with electrolysis time. TEM of the synthesized CNT product subsequent to 15 minutes (panel a), 30 minutes (panel b) or 90 minutes (panel c) electrolysis reaction. The graphene spacing between the CNT walls is about 0.34 nanometers (nm) for adjacent graphene layers. However, when the nucleation additive (nickel powder) is excluded during the synthesis, the result is a high-yield synthesis of carbon nano-onions (CNO) and carbon platelets instead.

Figure 3:
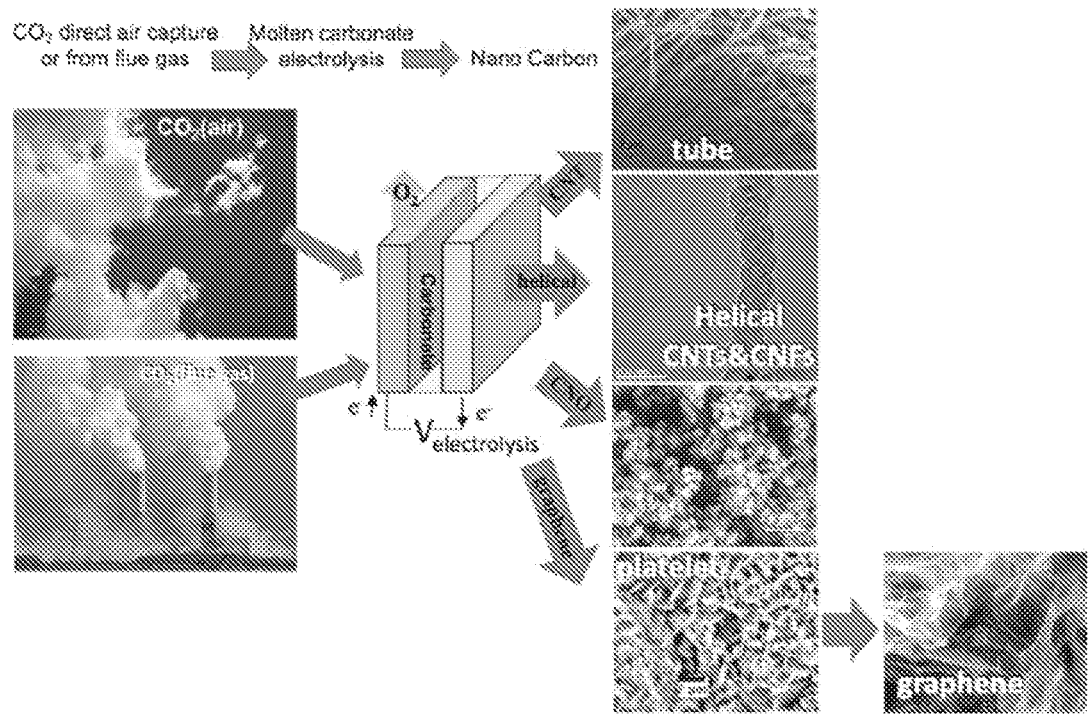
FIG. 3 is a schematic that represents an overview of molten carbonate processes for making various carbon nanostructures, including HCNTs and helical carbon nanofibers (HCNFs).

FIG. 3 is schematic that shows pathways for high-yield electrolytic synthesis of carbon nano materials that consume CO2 as a reactant, either directly from the air or from smoke/flue stack CO2, in molten carbonate.

Under appropriate electrochemical conditions, an electrolysis reaction that is performed in molten carbonate transforms CO2, either from atmosphere or from flue gas, into specific carbon nanomaterial products at high yield.

By altering the conditions of the electrolysis reaction, such as the materials used to form either electrode and electrolyte additives, the electrolysis reaction can produce a variety of carbon nanostructures morphologies, including large diameter (between about 500 nm and about 1 µm), long (about 1 mm), wool-like CNTs; straight, moderate diameter (about 175 nm), medium length (about 100 µm) CNTs; tangled, smaller diameter (about 125 nm) CNTs, short (about 50 µm) CNTs; much shorter (about 10 µm) CNTs and smaller diameter (about 50 nm) CNTs; thinner walled, smaller diameter (about 50 µm) CNTs or combinations thereof.

For example, different electrode materials can produce different CNT products (FIG. 3). Nickel containing alloys are often used as anode materials during the electrolysis reaction for at least two reasons:

1) nickel from the electrode that dissolves in the electrolyte acts as a good nucleation point, and 2) under oxidation, the nickel forms a stable nickel oxide layer on the anode that acts as an effective electro-catalyst for oxygen generation at the anode (see reaction (2) above).

As such, anodes made from various nickel containing alloys have been investigated. Nichrome (nickel chromium based alloys) including stainless steels such as SS 304 or SS 316, and inconel alloys, such as Inconel 600, 625, and 718 or Nichromes such as Chromel A, B or, as the co-nucleation of the alloy components are known to produce high quality CNTs. Binary and ternary transition metal nucleation agents that include, but are not limited to: Ni, Cr, Sn, In, Fe, and Mo can also effect CNT growth.

Cathode material compositions can also influence the electrolysis reaction for synthesizing CNTs, CNOs and graphene. Examples of materials used to make suitable cathodes include, but are not limited to: galvanized steel (which utilize Fe and Zn and Ni from the anode to form nucleation points); Cu, Monel, and brass (which utilize co-nucleation of Ni, Cu, Zn, and trace Fe or combinations thereof.

However, what has not yet been clearly demonstrated is how to manipulate the conditions of the electrolysis reaction in order to synthesize various morphologies of helical carbon nanostructures (HCNS) using CO2 as a reactant and a molten carbonate as the electrolyte.

The embodiments of the present disclosure relate to a high-efficiency system and method for directly removing CO2 from the atmosphere or chemical/energy plants and turning the removed CO2 into useful products. In particular, the embodiments of the present disclosure relate to the synthesis of various morphologies of HCNS from CO2 or other sources of carbon.

As a general category of carbon nanostructures, HCNS can include: helical carbon nanotubes (HCNTs), helical carbon nanofibers (HCNFs), double stranded HCNTs, braided HCNTs, helical nano-platelets (HCNPs), sp3 defective CNTs, deformed CNTs, bent CNTs, curved CNTs or combinations thereof. For clarity, the term HCNS includes regular repeating helical morphologies, both symmetric and non-symmetric morphologies and defective or deformed CNTs that do not have a regular, repeating helical morphology but include bends, curves or other morphologies that distinguish them from CNTs that are not defective or deformed.

HCNTs may have many uses, including but not limited to: high-performance electromagnetic wave absorbers, sensors, resonators, nanoscale mechanical springs, electrical inductors, and generators of magnetic beams and various medical-applications.

HCNTs exhibit properties that relate to high degrees of magnetization. For example, if electricity is applied to HCNTs, the bends in the HCNTs create a magnetic field, acting much like a solenoid. When a high frequency magnetic field is applied to an HCNTs, the HCNTs create electricity. These properties make for strong interactions with electromagnetic waves.

Furthermore, if HCNTs are compressed, the curve experiences strain differently and has different electronic properties in different regions allowing for a strong piezo-electric effect where a mechanical force can be turned to electricity and an electric current can be turned into a mechanical force such as a compressive force or vibrations. These properties of HCNTs may provide for mechanically tunable electronic properties. Collectively, all of these properties may make HCNTs an ideal candidate for nanoelectronics, nanomechanical systems, and nanosensors. HCNTs may also act as a superconductor.

HCNTs are also known to enhance an early immune response influence phagocytosis during bacterial infection with *Pseudomonas aeruginosa*.

The embodiments of the present disclosure relate to the electrochemical conditions that result in converting CO2 into HCNS, including HCNTs, HCNFs (helical carbon nanofibers), HCNPs (helical carbon platelets), defective CNTs, bent CNTs, nearly or completed filled carbon nanotubes that comprise carbon nanofibers, or combinations thereof.

Some embodiments of the present disclosure relate to a system that provides an electrolysis reaction that synthesized HCNS. The system comprises a pair of electrodes, a cathode and an anode that define an inter-electrode space, which may also be referred to as an electrolysis space, which can receive and contain electrolyte. The system also includes a source of electric current, a source of a carbon input and a source of heat.

In some embodiments of the present disclosure, the cathode is formed as planar structure, a wire structure a screen, a porous structure, a conductive plate, a flat or folded shim, a coiled structure or the cathode can form at least part of the inner sides of the case. The cathode can be formed of various conductive materials that reflect the need for variation of the nucleation point and the carbon product that forms on the cathode. Such cathode forming materials include, but are not limited to: any conductive material, galvanized (zinc coated) steel, titanium, graphite, iron, an alloy that comprises copper and zinc, Monel (Ni 400, a Ni/Cu alloy), Inconel, Nichrome, pure Cu, and brass alloys may also be suitable. It has been observed that each cathode material had an effect on the linear (non-coiled) CNT products. As one example, Cu cathodes produce very small diameter tubes, steel cathodes produce very tangled CNTs, Muntz brass (60% Cu, 40% Zn alloy) cathodes result in a high purity of CNTs.

In some embodiments of the present disclosure, the anode is formed as a planar structure, a wire structure, a screen, a porous structure, a conductive plate, a flat or folded shim, a coiled structure or the anode can form at least part of the inner sides of the case. The anode can be formed of various conductive materials so that the anode may be oxygen generating or not. Such anode forming materials include, but are not limited to: any conductive material that establishes a highly stable oxide outer layer that is conducive to oxygen production during the electrolysis reactions performed according to the embodiments of the present disclosure, Ni, Ni alloys, galvanized (zinc coated) steel, titanium, graphite, iron, and a wide variety of metal which establish a highly stable oxide outer layer that is conducive to oxygen production. Examples of suitable materials for forming the anode include Nichrome (nickel chromium based alloys) including stainless steels such as SS 304 or SS 316, and inconel alloys, such as Inconel 600, 625, and 718, alloy C-264, or Nichromes such as Chromel A, B or, as the co-nucleation of the alloy components are known to produce high quality CNTs. Binary and ternary transition metal nucleation agents that include, but are not limited to: Ni, Cr, Sn, In, Fe, and Mo can also effect carbon product growth.

In some embodiments of the present disclosure, a transition metal such as nickel may be added on the anode, which can be dissolved from the anode to migrate through the electrolyte onto the cathode. The added transition metal can function as a nucleating agent, which may be selected from nickel, iron, cobalt, copper, titanium, chromium, manganese, zirconium, molybdenum, silver, cadmium, tin, ruthenium, or a mixture thereof. The transition metal may also be introduced as a dissolved transition metal salt to the electrolyte directly to migrate onto the cathode. It is also possible to add the transition metal nucleating agent directly onto the cathode.

The cathode and anode may be aligned substantially parallel to each other within a case, such as a stainless steel case or a case made of substantially pure or pure alumina. The case may be made of any material that is suitable to contain the molten carbonate and to sustain the temperatures achieved by the system. The electrodes may be oriented in any orientation, including but not limited to substantially horizontally or substantially vertically, but spaced apart from each other so as to define an inter-electrode space therebetween. In some embodiments of the present disclosure, the inter-electrode space is between about 0.1 cm and about 10 cm. In some embodiments of the present disclosure, the inter-electrode space is about 1 cm. As will be appreciated by those skilled in the art, the dimensions of the inter-electrode space will be dictated by the scale of the system, such as the size of each electrode, the plenum defined within the case, the amount of electric current applied and combinations thereof.

The source of electric current can be any source of an alternating current or a direct current, either constant or not, that provides a current density of at least about 0.1 A/cm2. In some embodiments of the present disclosure, the current density provided between the electrodes is at least 0.2 A/cm2, 0.3 A/cm2, 0.4 A/cm2, 0.5 A/cm2, 0.6 A/cm2, 0.7 A/cm2, 0.8 A/cm2, 0.9 A/cm2, 1.0 A/cm2 or greater. The power for the source of electric current may be any power source or combination of power sources, including electrical power sources, solar power sources and the like.

The source of heat can be any source of heat increases the temperature within the space within the case to a temperature of at least about 725° C. In some embodiments of the present disclosure, the temperature within the case can be increased to between about 750° C. to about 800° C. or hotter. In some embodiments of the present disclosure, the source of heat is provided by, or is supplemented by, the exothermic reaction of carbon dioxide absorption and conversion to carbonate, or an overpotential of applied electrolysis current.

The source of a carbon input may be any source of carbon including CO2. For example, environment air may provide a CO2 source. Emission gases from various plants or chemical reactors may provide CO2 sources. For example, power generating plants, steam generation facilities, or pyrolysis reactors may emit CO2. CO2 emitted from these types of systems or in the production of the high carbon footprint substance may also be used as a CO2 source. In addition, the CO2 product of the combustion or transformation of fossil fuels for heating, transportation, and carbon products such as polymers and plastics can also be sources of CO2. The case is configured to receive the carbon input, such as CO2, within the inter-electrode space.

In some embodiments of the present disclosure, the electrolyte may comprise carbonate that can be heated by the heat source until it transitions to a molten phase. Conveniently, carbon nanomaterials produced from a molten carbonate by electrolysis can be produced with a relatively low carbon footprint and even a negative carbon footprint—because CO2 is consumed as a reactant—and a relatively low cost, as compared to carbon nanomaterials produced by other conventional techniques such as chemical vapor deposition (CVD) synthesis, flame synthesis, or plasma synthesis. For example, the carbonate may be a lithium carbonate or lithiated carbonate. Molten carbonates, such as a lithium carbonate Li2CO3, which has a melting point of 723° C., or lower melting point carbonates such as LiBaCaCO3, having a melting point of 620° C., when containing oxide that is a result of electrolysis, such as exemplified, but not limited by, in equation 2, or when mixed with highly soluble oxides, such Li2O and BaO, sustain rapid absorption of CO2 from the atmospheric or the exhaust CO2. Suitable carbonates may include alkali carbonates and alkali earth carbonates. Alkali carbonates may include lithium, sodium, potassium, rubidium, cesium, or francium carbonates, or mixtures thereof. Alkali earth carbonates may include beryllium, magnesium, calcium, strontium, barium, or radium carbonates, or mixtures thereof. In some embodiments of the present disclosure, the electrolyte can be a mixed composition for example, a mix of alkali and alkali earth carbonates and one or more of an oxide, a borate, a sulfate, a nitrate, a chloride, a chlorate or a phosphate. Without being bound by any particular theory, a mixed electrolyte may also induce HCNS growth for at least the following reasons; (i) a complex mixture may make the lengthening of CNT slower than its extrusion out of the catalyst allowing for improved helical growth; (ii) the more complex electrolyte mixture may introduce anisotropic growth conditions by either directly causing different growth rates or indirectly effecting catalysts morphology or what species appear in solution; (iii) the more complex electrolyte mixture may lower "correction" of pentagonal or heptagonal defects and perhaps even increase them resulting in repeated curvature or defects that cause such curvature; or (iv) combinations thereof. Eutectic mixtures of different carbonates may also offer different temperature regimes due to their lower melting points.

In some embodiments of the present disclosure, the molten carbonate electrolyte may be supplemented with one or more additives by adding the one or more additives into the inter-electrode space—for example by direct addition into the molten electrolyte, a non-molten electrolyte precursor, or combinations thereof. Metal oxide electrolyte additives can be used as an sp3 defect inducing agent that increases sp3 compare to sp2 bonding, and these defects may be compatible with the increased twisting observed in the various HCNS morphologies. Some non-limiting examples of metal oxides that act as sp3 defect inducing agents include lithium oxide, iron oxide, barium oxide, nickel oxide, cobalt oxide, and chromium oxide. Additive oxides may also increase $CO_2$ absorption and may lower the electrolysis voltage requirements. Other electrolyte additives may include borates, sulfates, nitrates and phosphates.

Transition metal nucleating agents may also affect helical carbon nanotube grown by molten carbonate electrosynthesis. Ni is a known CNT nucleating agent, and nickel containing metals such as nichrome and Inconel alloys may provide highly stable anodes during molten carbonate as well as a source of nickel for nucleation.

In some embodiments of the present disclosure, the electrolyte additives and the transition metal nucleating agents may be positioned within the inter-electrode space as a separate component that is added there, that is added to a non-molten electrolyte precursor or they may be positioned within the inter-electrode space as part of one or more of the electrodes.

EXAMPLES

Example 1—General Procedures

Lithium carbonate ($Li_2CO_3$, 99.5%), and lithium oxide ($Li_2O$, 99.5%), are combined with various additives—or not—and heated to form different molten electrolytes.

Electrolysis reactions were driven at a constant current density as described further below. The electrolysis reaction was contained in a pure alumina or pure, stainless steel 304 case. Inconel, Nichrome, or stainless steel were used to form an oxygen-generating anode. Muntz brass or Monel were used as to form a cathode.

During the electrolysis reaction, the details of which are described further below, the synthesized carbon product accumulated at the cathode, which was subsequently removed and cooled. After the electrolysis reaction, the carbon product remained on the cathode but fell off or peeled off when the cathode is extracted from the stainless steel 304 case, cooled, and tapped or scraped.

The carbon product is then washed with either deionized water (DI water) or in up to 6 molar hydrochloric acid (HCl). Both washes yield a similar product, but the acid solution accelerates washing. The washed carbon product is then separated from the washing solution by either paper filtration or centrifugation. Both separation techniques yield a similar carbon product, but centrifugation accelerates the separation.

The washed and separated carbon product was then analyzed by PHENOM Pro Pro-X SEM with electron dispersive spectroscopy (EDS) and by FEI Teneo Talos F200X TEM and by scanning electron microscopy (SEM, PHENOM Pro-X SEM with EDS).

Example 2—HCNS Synthesis

Figure 4A:
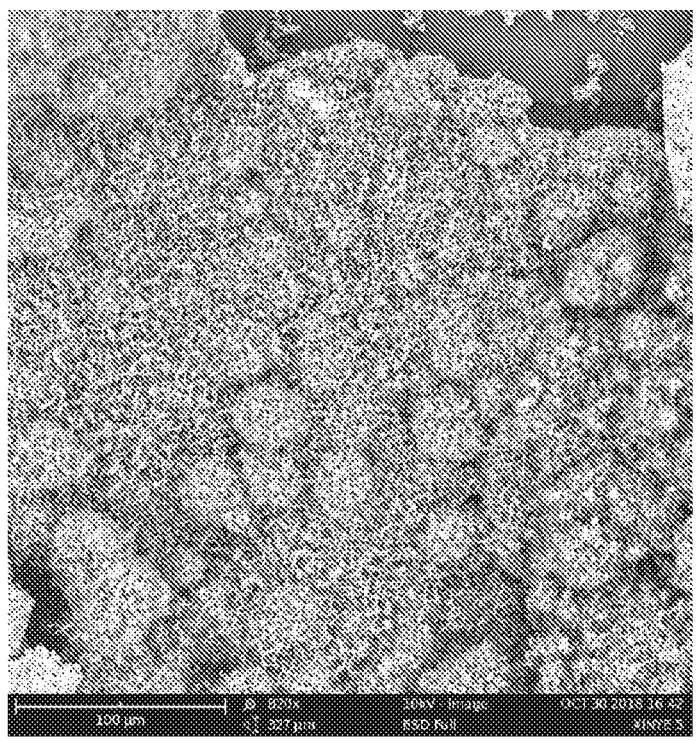
FIG. 4A shows scanning electron microscope (SEM) images of HCNS, with a scale bar of 100 microns.
Figure 4B:
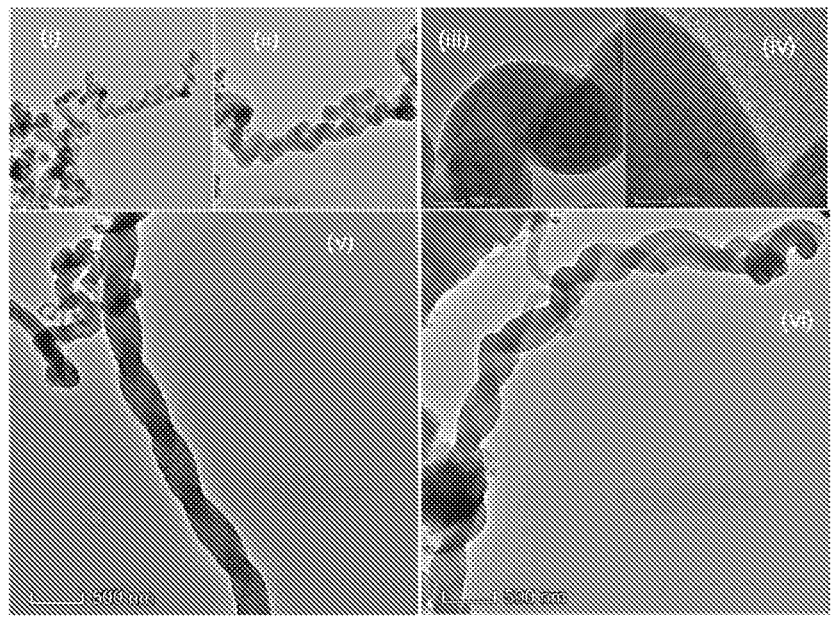
FIG. 4B shows TEM images of HCNS synthesized according to embodiments of the present disclosure, wherein (i) and (ii) have scale bars of 500 nm, (iii) has a scale bar of 100 nm, (iv) has a scale bar of 20 nm and (v) and (vi) have scale bars of 500 nm.

One unusual carbon product may form when conducting the electrolysis reaction at high current densities, according to embodiments of the present disclosure. For these electrolysis reactions, the cathode was a coil of 5 cm2 Monel wire situated about 0.5 cm below an 0.5 cm2 coiled wire Ni anode. The carbon product for this synthesis was synthesized using about 0.4 A/cm2 current density (as compared to about 0.05 A/cm2 to about 0.3 A/cm2 when non-helical CNTs are formed through known electrolysis reaction methods) in 770° C. $Li_2CO_3$ for about 2.5 hours in an alumina crucible. A scanning electron microscope (SEM) of this unusual product is shown in FIG. 4. FIG. 4A shows SEM images and the panels of FIG. 4B show TEM images of this carbon product. The SEM images of the carbon product show a mix of conventional, tangled CNTs and HCNTs.

Example 3—CNT Synthesis

FIG. 5 presents SEM images of cleaned and separated carbon product synthesized by an electrolysis reaction, according to embodiments of the present disclosure. In particular, a planar 27 cm2 Muntz Brass cathode was vertically separated about 1 cm from a 27 cm2 Nichrome C planar anode. These electrodes were used with a high current density of about 0.6 A/cm2 in a 750° C. molten $Li_2CO_2$ electrolyte that contained about 2 wt % dissolved $Li_2O$. This electrolysis reaction ran for about 30 minutes using $CO_2$ as a reactant. Based on the product mass, electrolysis occurred at greater than 90% coulombic efficiency (of the 4e-conversion). The electrolysis reaction product shown in FIG. 5C and FIG. 5D contained an additional 0.1 wt % of $Fe_2O_3$ within the molten electrolyte. As seen, the product is highly uniform and are straight; based on the product's mass the product is formed at over 98% coubombic efficiency. The carbon nanotube product purity is 97% purity and the CNTs are about 150 μm in length. Similar syntheses in which the 2 wt % $Li_2O$ additive was replaced by 10 wt % dehydrated borax, and in which the Muntz Brass Cathode was replaced by a Monel Cathode, or in which the NiCr anode was replaced by an Inconel 718, or SS 304 or C-264 produced similar results.

Without being bound to any particular theory, the predominance of HCNSs shown in FIG. 4 and FIG. 5 may be produced by molten carbon electrolytic splitting under growth conditions that: (1) maximize torsional stress, such as those that may occur during rapid, nucleated growth; (2) enhance defects that cause formation of heptagonal, rather than the conventional pentagonal building blocks of graphene cylindrical walls; (3) uniformly control those enhanced defects to repeatedly induce a uniform spiral conformation; and (4) employ combinations of (1), (2) and (3).

Example 4—Further HCNS Synthesis

Surprisingly, it was found that HNCS synthesis may be achieved by applying at least two of the following four experimental parameters: (i) high electrolysis current density growth, such as about 0.35 A/cm2 or higher; (ii) high temperature electrolysis temperatures, such as 770° C. or higher; (iii) using an sp3 defect inducing agents, such as added oxide; or, (iv) adding a controlled concentration of iron to the electrolyte or cathode surface. As will be appreciated by those skilled in the art, three or more of these experimental parameters are also contemplated.

Iron is an unusual transition metal carbon nanomaterial growth nucleating agent with a very high oxide solubility in lithiated molten carbonate. For example, it is known that up to 50 wt % of iron can be dissolved in molten lithium carbonate. In the embodiments of the present disclosure, surprisingly it was found that a controlled concentration of added Fe2O3, combined with an added oxide (such as Li2O) may induce defects during the formation of HCNSs, and applying a high current density of about 0.6 A/cm2 resulted in a high yield of HCNSs.

FIG. 6 shows SEM images of an entirely different product than the CNT Example 3 where the parameters of the electrolysis reaction were the same (Muntz Brass cathode, Nichrome C anode, high current density of 0.6 A/cm2 in a 750° C. molten Li2CO2 electrolyte that contained about 2 wt % dissolved Li2O). The electrolysis reaction of this Example 4 ran for the same 30 minutes using CO2 as a reactant, but the concentration of Fe2O3 is increased from 0.1 to 1 wt % in the electrolyte. Prior to cleaning to remove excess electrolyte the product appears the same (see FIG. 6A). However, rather than conventional CNTs, the carbon product now comprises a mixture of about 90% purity of small HCNTs (0.1 μm diameter by 3 μm length) and about 10% straight CNTs.

Low magnification TEM images of the HCNT product (also referred to as the major product) are shown in FIG. 7. The HCNT carbon product has a geometric configuration of a braided helix. High magnification TEM of the HCNT product is shown in FIG. 8. Using this higher magnification the spacing of the graphene layers in the HCNT walls was consistently about 0.34 nm, typical for adjacent graphene layers, and the observed HCNT wall thickness in all the TEM images varied from about 17 nm to about 38 nm.

FIG. 9 shows TEM of the straight CNTs (also referred to as the minor product). The minor product comprises CNTs, rather than HCNTs. As shown in FIG. 9A and FIG. 9C, these CNTs are either hollow or partially filled with Fe, Ni and/or Cr.

FIG. 10 shows the EDS results of the minor product at two points: within the CNT wall and at the interior "dark" portion of the CNT, which is indicative of metal. The CNT walls consist of substantially pure carbon (FIG. 10A), while when not empty, the interior contains iron and nickel (not shown) and/or chromium (FIG. 10B). The straight CNTs in the minor product appear nearly defect free. The measured straight CNT diameters varied from about 32 to about 200 nm, the diameter walls were comprised of as few as 16 and as many as 72 walls consisting of cylindrical graphene shells separated about 0.34 nm part. Without being bound to any theory, it is postulated that the iron regulates the rate at which nanocarbon building blocks are available, and when controlled properly and combined with a high rate of defects to provide heptagonal rather than pentagonal carbon, and a high, controlled growth to regulate torsional stress provides the first observed environment in which the principle product of molten carbonate electrolytic splitting of CO2 is HCNTs.

Example 5—Further HCNS Synthesis

In this Example 5, the electrolysis reaction was performed according to the following parameters: a planar 27 cm2 Muntz Brass cathode was vertically separated 1 cm from a 27 cm2 Nichrome C planar anode, a high current density of about 0.6 A cm−2 in a 750° C. molten Li2CO2 electrolyte that contained about 2 wt % dissolved Li2O. The electrolysis reaction of this Example 5 ran for about 30 minutes using CO2 as a reactant and 1.7 wt % Fe2CO3 was added to the molten electrolyte.

At the higher amounts of Fe2O3 (1.7%) added to the lithium carbonate electrolyte, the HCNT growth is disrupted. HCNS growth continues, but in a planar spiral, rather than a CNT spiral morphology, referred to as helical carbon nanoplatelets (HCNPs). FIG. 11 shows SEM images of the HCNS product of this 1.7 wt % Fe2O3 following about 30 minutes of a molten electrolysis reaction, according to embodiments of the present disclosure. The washed product consists of over 80% of the HCNP morphology and the remainder of the product is a mix of helical platlets, nanoonions and nanotubes, and a small percentage of single (rather than double helix) HCNTs. The observed corkscrew HCNP morphology resembles a classical macroscopic rotini or fusilli pasta shape, and it is noted that this shape may be formed as solid or hollow tubes are twisted into corkscrew shapes. Without being bound to any theory, it is postulated that carbon building blocks, as ejected by the combined carbon reduction and formed iron carbide nucleation, are produced at too high a rate to maintain growth of the helical nanotube morphology and this may result in the HCNP morphology.

Example 6—Further HCNS Synthesis

Further phenomena are observed at intermediate concentrations of Fe2O3 between 1% and 1.7% while maintaining high current density (about 0.6 A/cm2), which is observed to produced a high purity of HCNTs at the 1% Fe2O3 concentration and a high purity of HCNPs at the 1.7% Fe2O3 concentration. With all other electrolysis reaction parameters the same as in Example 5 (a planar 27 cm2 Muntz Brass cathode vertically separated about 1 cm from a 27 cm2 Nichrome C planar anode, 750° C. Li2CO3 with 2 wt % Li2O at a high current density of 0.6 A cm−2 for 30 minutes) except using 1.3% Fe2O3, the carbon building blocks may be forming faster than at the lower concentrations of Fe2O3 (such as in Example 4) and the carbon nanotubes, whether regular or helical, tend to fill up with concentric cylindirical graphene shells, such that the there is no open core within the nanotubes. This morphology has previously been described as carbon nanofibers (CNF), although this helical CNF variant (HCNF) was not observed.

As shown in FIG. 12, when using 1.3% Fe2O3 the carbon product consisted of about 60% CNF, about 20% HCNFs, about 15% HCNPs, and about 5% nearly defect-free CNTs. The diameter of the helical nanostructures is between about 300 nm to about 700 nm. As shown in FIG. 13, with an increase to 1.5% Fe2O3, in the product the concentration of HCNPs increased to about 30% and the observed remainder largely consist of single, irregularly coiled helical HCNS.

Example 7—Further HCNS Synthesis

In the absence of (i) high electrolysis current density growth; (ii) high temperature electrolysis growth (such as 725° C. or higher); (iii) a sp3 defect inducing agents, such as added oxide; or, (iv) a controlled concentration of iron added to the electrolyte or cathode surface, deformed, curved or bent CNTs can still be formed that still are HCNS but without regular repeating helical patterns.

In this Example 7, HCNS were synthesized by an electrolysis reaction, according to embodiments of the present disclosure, with the following parameters: a Muntz Brass cathode spaced from a 30 cm2 area planar Nichrome C anode, applying a current density of about 0.5 A/cm−2 in pure 750° C. Li2CO3 (without additives) using CO2 as a reactant for about 2 hours. But as shown in FIG. 14A, the HCNS product can be without a regular, repeating helical morphology such as, but not limited to: defect CNTs, deformed CNTs, bent CNTs, curved CNTs combinations thereof.

The electrolysis reaction parameters described herein demonstrated a high yield of HCNT, HCNP or CNT formation, but other molten electrolyte conditions can synthesize such nanomaterials, albeit at lower yield. For example, in a pure Li2CO3 electrolyte (without any Li2O or Fe2O3 additives) at a relatively high current density of 0.5 A cm−2, a smaller fraction of about 20% HCNTs and HCNPs are produced along with a majority of curled CNTs, as shown in FIG. 14B.

FIG. 14C and FIG. 14D show HCNTs and HCNPs can be synthesized in certain ternary electrolytes, even at lower current density and in the absence of Fe2O3, albeit at lower yield. Specifically, the product of a molten carbonate electrolysis containing 20 wt % Na2CO3 and 80 wt % Li2CO3 and an additional additive of about 8 wt % dehydrated borax was used to split CO2 at a low current density of 0.2 A/cm−2. FIG. 14C shows that the major electrolysis product was curled CNTs with a significant co-product of HCNTs and HCNPs (shown in FIG. 14D).

Both electrolyte, and electrode composition, and (high) current density, defect and growth controlling additives all may have important roles in the formation of HCNS. With control of these parameters, according to the embodiments of the present disclosure, a variety of specific, uniform high-yield HCNS can be synthesized by molten carbonate electrolysis reactions.

We claim:

1. A method for synthesizing helical carbon nanostructures (HCNS), the method comprising steps of:
   (a) aligning an anode spaced from a cathode for defining an inter-electrode space;
   (b) introducing a molten carbonate electrolyte into the inter-electrode space;
   (c) introducing a carbon input into the inter-electrode space;
   (d) applying a current across the electrodes;
   (e) applying at least two of the following parameters:
      (i) applying the current with an electrolysis current density of at least 0.2 A/cm$^2$;
      (ii) heating the inter-electrode space to at least 725° C. before the step of applying a current;
      (iii) adding into the inter-electrode space an electrolyte additive agent; and
      (iv) adding iron oxide to the inter-electrode space, and
   (f) collecting a product that comprises a yield of at least 20% by weight of the HCNS from the cathode, wherein the HCNS comprises one or more of a helical carbon nanotube (HCNT), a helical carbon nanofiber (HCNF), a double stranded HCNT, a braided HCNT, a helical carbon nano-platelet (HCNP), and combinations thereof.

2. The method of claim 1, wherein the product further comprises a sp$^3$ defective CNT, a deformed CNT, a bent CNT, a curved CNT and combinations thereof.

3. The method of claim 1, wherein the electrolysis current density is greater than 0.2 A/cm$^2$.

4. The method of claim 1, wherein the inter-electrode space is heated to at least 750° C.

5. The method of claim 1, wherein the electrolyte additive is an sp$^3$ defect inducing agent.

6. The method of claim 5, wherein the sp$^3$ defect inducing agent is an oxide.

7. The method of claim 6, wherein the oxide is a metal oxide.

8. The method of claim 1, wherein the additive is one or more of a borate, a sulfate, a nitrate, a phosphate and combinations thereof.

9. The method of claim 1, wherein the iron oxide is added into the inter-electrode space by adding the iron into the electrolyte, dissolving iron from the anode, an electrolyte precursor, including iron on a surface of the cathode, or combinations thereof.

10. The method of claim 1, wherein the molten carbonate electrolyte comprises an alkali carbonate, an alkali earth carbonate or combinations thereof.

11. The method of claim 1, wherein the product comprises a yield of at least 20% by weight of HCNTs.

12. The method of claim 1, wherein the product comprises a yield of at least 20% by weight of double stranded HCNTs.

13. The method of claim 1, wherein the product comprises a yield of at least 20% by weight of braided HCNTs.

14. The method of claim 1, wherein the product comprises a yield of at least 20% by weight of HCNPs.

15. The method of claim 14, wherein the HCNP defines a corkscrew shape and comprises a solid tube, a hollow tube and combinations thereof.

* * * * *